(12) United States Patent
Snetting et al.

(10) Patent No.: US 9,714,129 B2
(45) Date of Patent: *Jul. 25, 2017

(54) INDEXABLE DISPENSER CARTRIDGE

(71) Applicant: King Technology Inc., Hopkins, MN (US)

(72) Inventors: Mark Snetting, Eden Prairie, MN (US); Jeffrey D. Johnson, Hopkins, MN (US)

(73) Assignee: KING TECHNOLOGY, INC, Hopkins, MN (US)

(*) Notice: Subject to any disclaimer, the term of this patent is extended or adjusted under 35 U.S.C. 154(b) by 617 days.

This patent is subject to a terminal disclaimer.

(21) Appl. No.: 14/150,701

(22) Filed: Jan. 8, 2014

(65) Prior Publication Data
US 2014/0197183 A1 Jul. 17, 2014

Related U.S. Application Data

(62) Division of application No. 12/075,003, filed on Mar. 7, 2008, now Pat. No. 8,617,481.

(51) Int. Cl.
B65D 83/00 (2006.01)
B01F 1/00 (2006.01)
C02F 1/76 (2006.01)
C02F 103/00 (2006.01)
C02F 103/42 (2006.01)

(52) U.S. Cl.
CPC ............ *B65D 83/00* (2013.01); *B01F 1/0027* (2013.01); *C02F 1/76* (2013.01); *C02F 2103/007* (2013.01); *C02F 2103/42* (2013.01); *C02F 2201/006* (2013.01); *Y10T 137/0329* (2015.04)

(58) Field of Classification Search
CPC ...... B65D 83/00; B01F 1/0016; B01F 1/0022; B01F 1/0027; C02F 1/688; C02F 1/76; C02F 2201/006; Y10T 137/0329
See application file for complete search history.

*Primary Examiner* — Timothy Cleveland
(74) *Attorney, Agent, or Firm* — Jacobson & Johnson LLC

(57) ABSTRACT

An indexable cartridge and method that is useable in either a stagnant fluid environment or in a moving fluid environment with the indexable cartridge floatable in a stagnant fluid environment and securable in a moving fluid environment with the indexable cartridge having a housing having one or more diffusion ports and a sleeve having one or more diffusion ports indexable to a diffusion port alignment through resilient yielding of the sleeve while a set of ribs inhibit lateral flow therebetween.

12 Claims, 3 Drawing Sheets

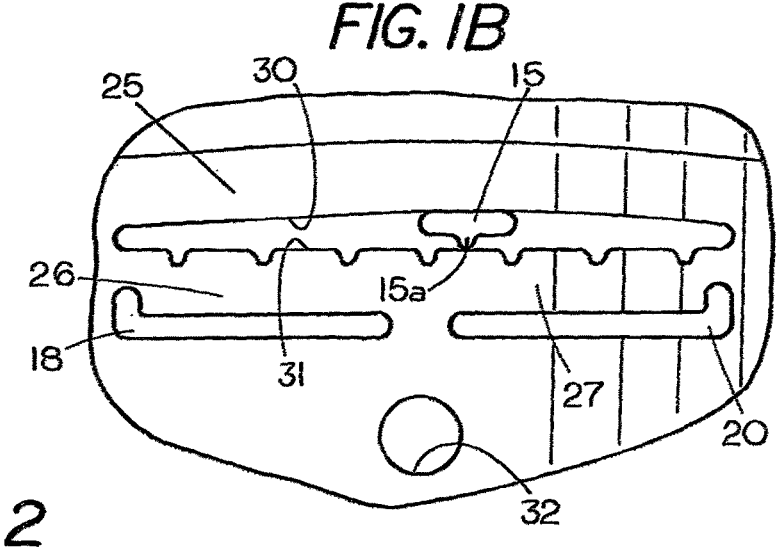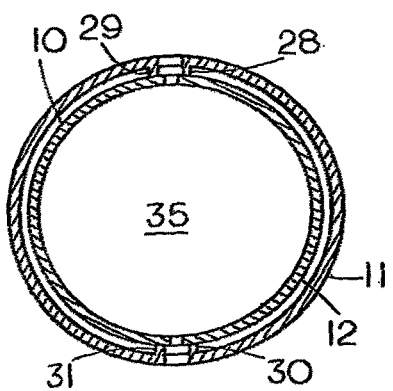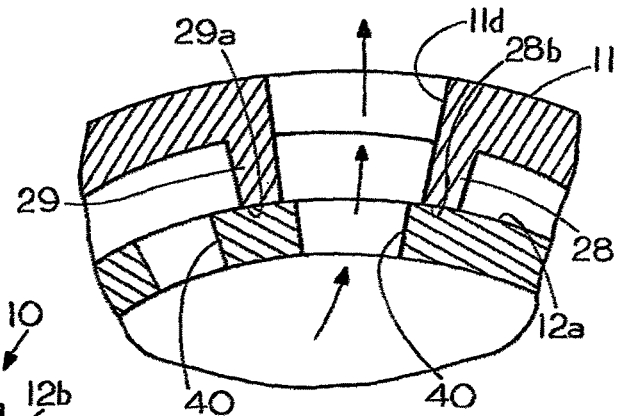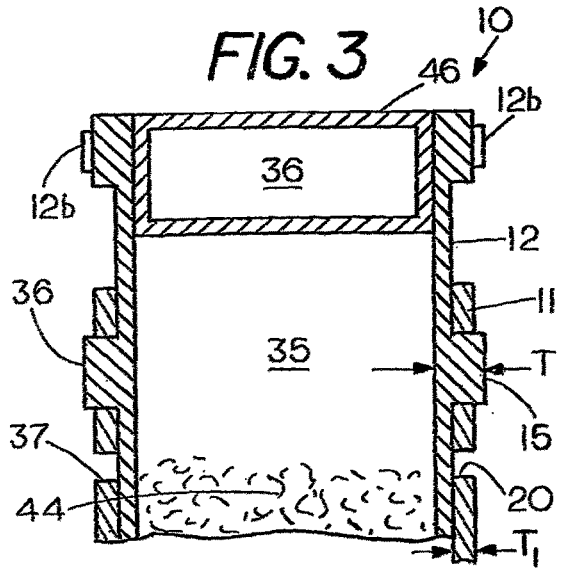

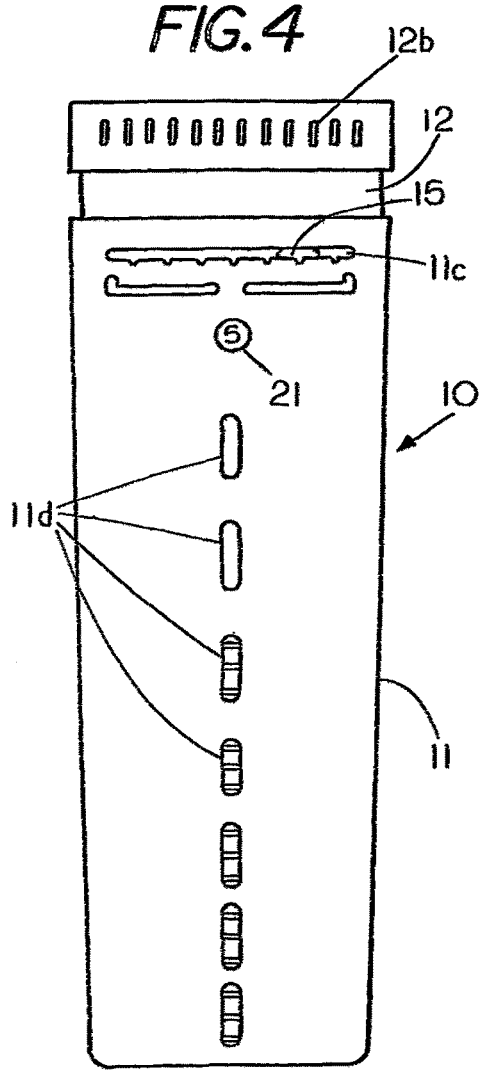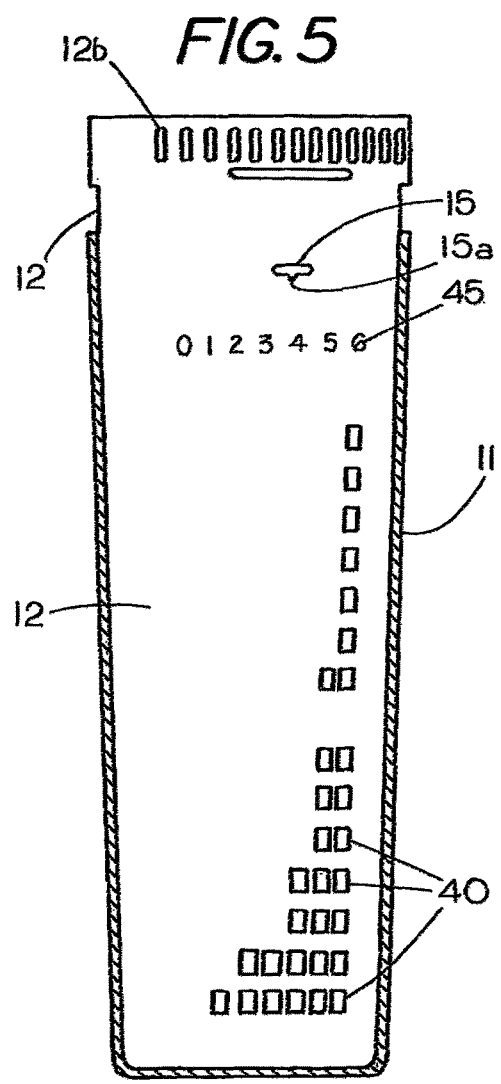

INDEXABLE DISPENSER CARTRIDGE

CROSS REFERENCE TO RELATED APPLICATIONS

This application is a division of currently pending U.S. patent application Ser. No. 12/075,003, filed Mar. 7, 2008, titled INDEXABLE DISPENSER CARTRIDGE.

FIELD OF THE INVENTION

This invention relates generally to dispensers and, more specifically, to an indexable universal cartridge or dispenser that is usable in either a stagnant fluid environment or in a moving fluid environment to provide an indexable control of the rate of dispersant from a zone within the dispenser to a zone exterior of the dispenser.

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of inline dispensers and floating dispensers for dispensing a dispersant into a body of fluid such as a body of water is known in the art. In general, two types of dispensers exist, one for use in stagnant bodies of fluids and one for use in moving fluid streams.

An example of a floating dispenser for use in stagnant fluid such as found in an open spa, a hot tub or a swimming pool is shown in King U.S. Pat. No. 4,702,270. The floating dispenser includes an outer rotatable cylindrical housing located around a cylindrical container. To adjust the amount of dispersant released the inner housing and the outer housing are rotated with respect to one another to either increase or decrease the fluid flow area or the hole area in the side wall of the dispenser.

An example of an inline dispenser for use in dispensing materials into a moving fluid environment, such as in an inline system, is shown in U.S. Pat. No. 4,270,565. The dispenser comprises a container with openings spaced circumferentially around the bottom of the container, which is normally shielded by an outer sleeve. In operation, the container is lowered into a fluid stream to allow the fluid stream to flow directly through the container. By raising or lowering the portion of the container in contact with the fluid stream one can allow more or less of the fluid stream to flow through the container. In this type of system, one can control the release of dispersant into the inline system by controlling either the size of the fluid stream flowing through the dispenser or the velocity of the fluid stream.

In general, a user having both an inline system with a moving fluid environment and an open system with a stagnant fluid environment requires two different types of dispensers in order to controllable release the dispersant in each system. That is, one type of dispenser for the stagnant fluid environment and a second type for the inline system, which has a moving fluid environment. The present invention comprises a universal cartridge that can be adjusted to controllable release the proper amount of dispersant in either a stagnant fluid environment or a moving fluid environment.

Each of the above type of dispensing member works well when used in the proper fluid environment that it was designed for. However, it is difficult to use a dispenser, which works well in a stagnant fluid, in a moving fluid or conversely to use a dispenser, which works well in moving fluid, in a stagnant fluid and still obtain the proper dispersal rates. If one can not obtain the proper dispersal rates one can not achieve the proper concentration of the dispersant in the surrounding fluid. That is, the concentration of dispersant in the fluid may be either to high or to low. If the concentration of dispersant is a material, such as a bactericide, is to low it will not kill the bacteria in the fluid and if the concentration of the dispersant is to high it may be obnoxious or harmful. Either condition is unsatisfactory.

One of the difficulties with having a dispenser operate in either a stagnant fluid environment or in a moving fluid environment is that it appears that fluid flow conditions and, more particularly, it appears that fluid perturbations can have a substantial effect on the dispersal rate of a dispersant contained within a cartridge dispenser. Consequently, a cartridge dispenser that suitably dispenses a dispersant in a stagnant fluid environment can yield unpredictable dispersion rates when placed in a moving fluid environment even though the fluid velocity and flow rate remains the same.

Generally, the dispersant rate of a dispersant in a stagnant fluid is dependent on the difference in concentrations of the dispersant in different regions of the fluid. With a larger difference in dispersant concentrations between a dispersant in one part of the fluid and a dispersant in another part of the fluid one has a more rapid dispersant dispersal rate and with a lower difference in concentration between a dispersant in one part of the fluid and a dispersant in another part of the fluid the dispersant dispersal rate is less.

It is known that changing fluid conditions, such as changing the velocity of the fluid through a dispersant can alter the dispersant rate, i.e. the rate that a dispersant is transferred to the surrounding fluid. However, one of the problem that occurs is that if one increases the fluid velocity around a dispenser for stagnant fluids one does not always produce consistent dispensing results. That is, at one time a first velocity of fluid may produce one dispersant rate and at a later time the same fluid velocity may produce an entirely different dispersant rate. While not fully understood it is believed that fluid perturbations are present that can have a substantial effect on the dispersant dispersal rate. That is, the fluid perturbations can produce an unstable flow condition that cause the dispersant dispersal rate to fluctuate unpredictably over a wide range even though the flow rate might remain constant in the region of the dispenser.

The King Technology U.S. Pat. No. 7,059,540 discloses a universal cartridge dispenser that allows one to maintain predictable dispersant dispersal rates in either a stagnant fluid environment or a moving fluid environment when a moving fluid is directed around the universal cartridge dispenser. In the moving fluid environment one can position the universal cartridge proximate a moving fluid stream and obtain predicable results based on the dispersant transport area between the interior of the dispenser and the exterior of the dispenser. Similarly, in a stagnant fluid environment one can position the universal cartridge in a body of fluid and obtain consistent results based on the dispersant transport area in the universal cartridge dispenser. That is, it has been found that under either a stagnant fluid environment or a moving fluid environment one can effectively control the dispersant rate of the dispersant and hence the concentration of dispersant in the surrounding fluid. By allowing one to obtain a predictable and repeatable dispersal dispersant rate it allows one to use the universal cartridge dispenser in either a stagnant fluid environment or a moving fluid environment.

SUMMARY OF THE INVENTION

Briefly, the invention comprises an indexable universal cartridge and method that is useable in either a stagnant fluid environment or in a moving fluid environment with the indexable universal cartridge floatable in a stagnant fluid environment and securable in a moving fluid environment with the indexable universal cartridge having a housing having one or more diffusion ports and an outer sleeve having one or more diffusion ports with the housing and the outer sleeve mateable engaged with each other through frictional engagement of a set of elongated ribs to inhibit flow between non-aligned diffusion ports while permitting rotational displacement of the housing with respect to the sleeve to allow one to increase or decrease a dispersant transport area between a zone within the housing to a zone exterior to the housing through aligning one or more of the diffusion ports of the housing with one or more of the diffusion ports of the sleeve.

BRIEF DESCRIPTION OF THE DRAWINGS

FIG. 1b is a partial view of the index tab and yieldable region of the universal cartridge of FIG. 1A with the index tab in an intermediate position;

FIG. 2 is a cross section view taken along lines 2-2 of FIG. 1;

FIG. 2A is an enlarged view of the engagement of the elongated ribs and the housing of the universal cartridge;

FIG. 3 is a cross sectional view taken along lines 3-3 of FIG. 1;

FIG. 4 is a front view of the dispenser of FIG. 1 in a second dispensing mode;

FIG. 5 is a partial cross section view of the dispenser revealing the axial and transaxial extending rows of diffusion ports in the housing of the universal cartridge.

DESCRIPTION OF THE PREFERRED EMBODIMENT

Figure 1:
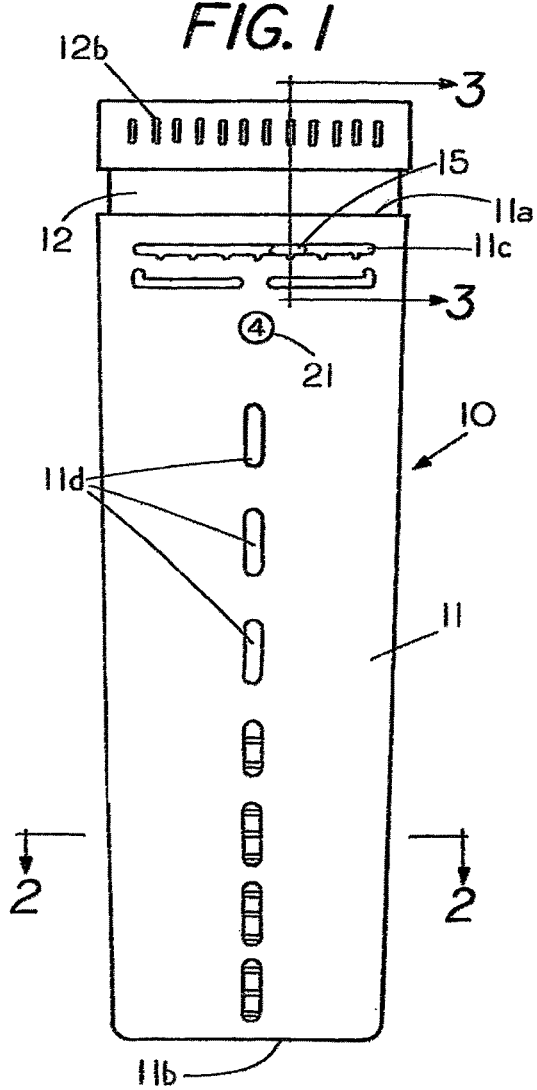
FIG. 1 is a front view of the indexable universal cartridge.

FIG. 1 is a front view of the universal cartridge 10. Universal cartridge 10 comprises an outer cup-like frusto conical sleeve 11 having an open top 11a and a closed bottom 11b. Extending in a circumferential direction partially around sleeve 11 is an indexing slot 11c. Extending in an axial direction and located along an axial surface element of sleeve 11 are seven elongated diffusion ports 11d. In the embodiment shown each of the seven diffusion ports 11d are located diametrical opposite seven identical diffusion ports (not shown) on the opposite face of sleeve 11. While seven diffusion ports 11d are shown in one face of sleeve 11 the number of diffusion ports can be selected based on the amount of diffusion required between the interior and the exterior of cartridge 10 therefore one or more diffusion ports can be placed in sleeve 11 depending upon the application and the need for more or less transfer of material threrethrough.

Figure 1A:
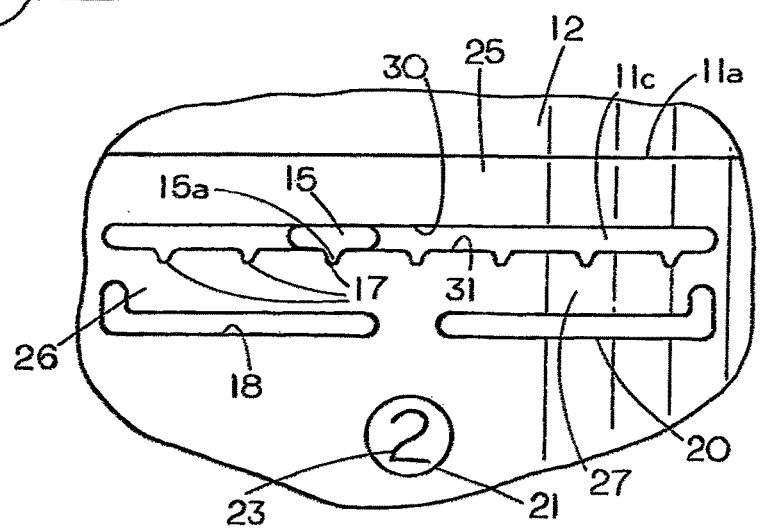
FIG. 1A is a partial view of the index tab and a yieldable region of the universal cartridge of FIG. 1 with the index tab in a first position.

Located on the top portion of sleeve 11 is a circumferentially extending indexing slot 11c and circumferentially extending L shaped relief slots 18 and 20 which are shown in enlarged view in FIG. 1A. The indexing slot 11c includes a set of seven notches 17 that extend substantially perpendicular to the slot 11c. FIG. 1A reveals resiliently yieldable sections of sleeve 11 comprising an upper axially resiliently yieldable band 25 that extends between slot 11c and top 11a and a first lower axially resiliently yieldable band 26 that extends between slot 11a and slot 18 and a second lower axially resiliently yieldable band 27 that extends between slot 11a and slot 20.

FIG. 1A shows a top portion of sleeve 11 with a housing 12 having a protruding index tab 15 an extension 15a located in one of the notches 17 in top of band 26. A viewing window 21 in sleeve 11 reveals a setting "2" on housing 12, which corresponds to a particular alignment of the one or more diffusion ports 40 of housing 12 with the one or more diffusion ports 11d of sleeve 11.

In the position shown in FIG. 1A the housing 12 and the sleeve 11 are rotationally linked to each other through extension 15a on index tab 15 which prevents accidental or inadvertent rotation of housing 12 with respect to sleeve 11. That is, the protruding index tab 15 on housing 12 is normally axially restrained from upward and downward movement by the upper sidewall 30 and lower sidewall 31 of slot 11c. Consequently index tab 15 is prevented from accidental or inadvertent rotational displacement with respect to sleeve 11c since the engagement of extension 15a with a notch 17 inhibits or restrains the rotation of housing 12 with respect to sleeve 11. The aforedescribed locking or linking engagement between index tab 15 and sleeve 11 prevents accidental rotation of housing 12 with respect to sleeve 11 and thus inadvertent misalignment of the one or more diffusion ports of the sleeve 11 and the one or more diffusion ports of the housing 12. Although the housing 12 and sleeve 11 are normally locked in place as shown in FIG. 1A the sleeve 11 is configured so as to selectively and resiliently yield when sufficient external torque is applied between housing 12 and sleeve 11. That is, the band 25 and the bands 26 and 27 provide an inherent resistance to yielding which is sufficient to normally maintain index tab 15 in the locked or linked position as shown in FIG. 1A. However, when the torque applied between housing 12 and sleeve 11 exceeds a sufficient threshold, a linking threshold, the lateral force exerted by index tab 15 causes one or more of the bands above and below slot 11c to begin to yield. As the bands resiliently yield and deflect the index tab 15 and hence housing 12 can be rotated with respect to sleeve 11.

FIG. 1B shows a condition during the resilient yielding of band 25 when the torque applied to the housing 12 with respect to the sleeve 11 has exceeded the linking threshold. In the condition the portion of sleeve 11 with the index tab and extension 15a are shown located intermediate lateral slots 17. This condition represents a rotation of housing 12 with respect to sleeve 11 as indicated by the circumferential displacement of index tab 15 with respect to slot 11c. Since the index tab 15 is sufficiently rigid because of greater thickness T than sleeve thickness $T_1$ one or more or all of the bands 25, 26 and 27 can axially and resiliently yield to allow the laterally passage of index tab 15 from one notch to another notch. Although the rigidity of tab 15 is obtained by greater thickness other methods including using different materials may also be used.

FIG. 1B illustrates the resiliently yieldable section of sleeve 11 showing the top circumferential band 25 flexing upward to allow the index tab 15 to be moved from one position to another position by rotation of housing 12 with respect to sleeve 11. With index tab 15 integrally formed to housing 12 and the sleeve 11 resiliently yieldable in response to an applied indexing torque one can provide a positive indexing between housing 12 and sleeve 11 without the aid of external separate locks or latches. Housing 12 and sleeve 11 can be made from a polymer plastic such as polypropylene since both the inherent stiffness of the index tab and the inherent yieldablity of the sleeve can be found in the same material. Although polypropylene is described it is envisioned that other materials can be used as long as the materials provide the proper characteristics that allow yielding and rigidity. In the example shown in FIG. 1B the yielding can occur because of the lesser material thickness T and length of the bands while the rigidity of the index tab can be obtained by the larger material thickness $T_1$.

While the index tab 15 has been described with respect to slot 11c, which is located on a front face of sleeve 11, a second index tab 36 is located on the back face of sleeve 11 (FIG. 3) with the second index tab and slot diametrical opposite from one another. Although index tabs and slots on opposite sides of the dispenser are described a single index tab and slot is sufficient to provide the axial and circumferential restraint between sleeve 11 and housing 12 to maintain housing 12 and sleeve 11 in an indexed position.

A reference to FIG. 2 reveals the concentric location of sleeve 11 with respect to housing 12 and chamber 35. Sleeve 11 and housing 12 are dimensions such that when assembled as shown in FIG. 1 a first set of elongated ribs 28, 29 on housing 12 engage an outer sealing surface on sleeve 11 and a second set of elongated ribs 30, 31 on the opposite side of housing 12 engage an outer sealing surface on the opposite side of sleeve 11 to inhibit lateral fluid transfer therepast and to encourage fluid transfer through a transport area defined by an alignment of one or more of the diffusion ports in housing 12 and one or more of the diffusion ports in sleeve 11. In the embodiment shown a set ribs are located on opposite sides of sleeve 11, however, if desired only one set of ribs can be used or if desired multiple sets of ribs could be included.

FIG. 2A is an enlarged view shown the first axially extending elongated rib 29 integrally formed to sleeve 11 with an end 29a sealingly engaging outer sealing surface 20a and a second axially extending elongated rib 28 with an end 28a sealingly engaging a sealing surface 20a on housing 12. The sealing ribs 28 and 29 are generally parallel to each other but need not be as long as sealing can be accomplished between rows of diffusion ports. In the position shown a diffusion ports 40 in housing 12 is in alignment with a diffusion ports 11d in sleeve 11. The elongated ribs 28 and 29 frictionally engage the housing surface 20a to form a fluid seal therebetween to inhibit lateral fluid transfer therepast and to encourage fluid transfer through a transport area defined by an alignment of diffusion ports 40 in housing 12 with a diffusion ports 11d in sleeve 11. Thus the lateral rib sealing on the sides of diffusion ports inhibits or prevents lateral flow and thereby maintains a constant size of the diffusion region between an interior of the dispenser and an exterior of the dispenser. In the embodiment shown a full frictional engagement between a first elongated rib 29 and a second elongated rib 28 extending therebetween does not occur until the sleeve 11 and housing 12 are in an axially fixed position with respect to each other as illustrated in FIG. 1

FIG. 5 shows a partial section view of the sleeve 11 revealing the set of axial and transaxial aligned diffusion ports located in housing 12. The number of diffusion ports 40 in each vertical row determine the number of diffusion ports 40 that can be aligned with the diffusion ports 11d. That is, the transaxial diffusion ports 40 are in axially alignment so that one or more of the diffusion ports 11d can be brought into axial alignment with the diffusion ports 11d in sleeve 11. Each of the diffusion ports 40 are latterly spaced from each other sufficiently far so that an elongated rib 29, 28, which are substantially parallel to each other can extend therebetween to form a lateral seal between the end of the rib and the housing as illustrated FIG. 2A. That is, end 29a and end 28a each form a lateral seal with surfaces 20a and 12a to inhibit or prevent lateral flow. Thus when the sleeve 11 contains an axial row of one or more diffusion ports 11d and the housing 12 contains a plurality of transaxial rows of the one or more diffusion ports 40 a first sealing rib 28 and a second sealing rib 29, which may be located substantially parallel to each other and having a width less than a lateral spacing between the one or more diffusion ports in the plurality of transaxial rows, can thereby inhibit lateral transfer of fluid between the housing 12 and the sleeve 11 thus providing a precise transport area from the inside of the dispenser to the outside of the dispenser.

Integrally formed to housing 12 are visual indicators comprising numerals 0-6 which provide a reference as to the rotational position of housing 12 with respect to sleeve 11. Each of the individual numerals can be selective viewed through window 32 in sleeve 11 as evidenced by FIG. 1 and FIG. 4. FIG. 1 shows the housing 12 and sleeve in one position with the number "4" visible with diffusion ports in the housing and the sleeve in alignment with each other. FIG. 4 shows the housing 12 and the sleeve 11 in a different rotatational position with respect to each other with the number "5" visible through the window 21. In this condition eight horizontal rows of diffusion ports 40 are in vertical alignment with 5 diffusion ports 11*d* in sleeve 11. While numerals are shown as visual indicators other types of visual indicators can be used. While the visual indicators are formed directly in the housing they may or may not be formed directly in housing 12. Also, if desired indicators can be placed on opposite sides of housing 12 so that one can view the setting of the dispenser cartridge from either side.

FIG. 3 shows that located at the top portion of cartridge 10 is a float 46 that has an air chamber 36 with sufficient buoyancy to maintain at least part of the universal cartridge 10 in a submerged condition and part of the universal dispenser in an unsubmerged condition. Float 45 can comprise an air chamber 36 that provides buoyancy to the cartridge. If desired the chamber 36 can be filled with a buoyant material other than air. Float 46 allows the universal cartridge or dispenser 10 to float in either a free floating or fixed position in stagnant fluid system.

Although housing 12 is shown with a frusto conical shape and the sleeve 11 has a frusto conical shape the housing 12 and sleeve 11 can also be shapes such as cylindrical if desired.

Housing 12 has a chamber 35 therein with dispersant 44 located in chamber 35. Typically, the dispersant can be any of the halogens or minerals or the like that yield a material that provides the necessary fluid treatment. Examples of minerals include ion yielding materials that can be used to treat water in hot tubs or swimming pools to rid the water their of unwanted organisms. One particularly well suited dispersant material uses silver chloride as an ion yielding material.

Thus, the invention includes a universal cartridge for controllable delivery of a dispersant in either a stagnant liquid or a moving liquid environment such as found in a hot tub, spa or swimming pool or other bodies of recreational water. The uses of the present invention are described in U.S.

patent application Ser. No. 11/406,840 Publication no. US 2006/0254968 which is hereby incorporated by reference.

It is apparent the invention includes the method of indexing a dispenser to change a first diffusion rate to a second diffusion rate by placing a dispensable material into a housing 12 having a one or more diffusion ports 11d with the housing normally linked to a sleeve 11 having one or more diffusion ports 40 and by torquing the sleeve 11 with respect to the housing 12 with sufficient torque so as to cause a portion of the sleeve 11 to resiliently yield to allow an indexing rotation of the sleeve with respect to the housing to thereby change an alignment of the one or more diffusion ports 40 of the housing 12 with the one or more diffusion ports 11d of the sleeve 11. By using a pair of ribs one can inhibit lateral flow between the housing and the sleeve and by engaging a pair of ribs on the sleeve with the housing one can inhibit lateral flow and by forcing an index tab from a first notch on sleeve 11 into a different notch in the sleeve 11 without deforming the index tab one can change the alignment of the diffusion ports of the housing with respect to the diffusion ports of the sleeve.

The invention claimed is:

1. An indexable universal cartridge for a dispersant material in either an open or a closed fluid system comprising:
 a housing having a chamber therein for carrying said dispersant material, said housing having a one or more diffusion ports therein to permit transfer of said dispersant material from said chamber;
 a sleeve having one or more diffusion ports therein, said sleeve includes an axially resiliently yieldable region having an upper axially resilient band located above a circumferential slot in the sleeve and a first lower axially resilient band and a second lower axially resilient band located below the circumferential slot in the sleeve, said axially resilient yieldable region extending partially around a circumference of said sleeve to normally inhibit rotation of an index tab integral with said housing but resiliently yieldable in response to an external torque between said housing and said sleeve, said circumferential slot having a plurality of notches for engaging an extension of the index tab to maintain the housing and the sleeve in a linked condition; and
 a first sealing rib located proximate one side of said one or more diffusion ports of said sleeve and a second sealing rib located proximate an other side of said one or more of said diffusion ports of said sleeve, said first sealing rib and said second sealing rib forming a fluid seal between said sleeve and said housing to inhibit lateral fluid transfer therepast and to encourage fluid transfer through a transport area defined by an alignment of the one or more of the diffusion ports in said housing and the one or more of the diffusion ports in said sleeve.

2. The indexable universal cartridge of claim 1 wherein the sleeve is indexable with respect to said housing.

3. The indexable universal cartridge of claim 1 wherein said index tab rotationally locks said housing to said sleeve.

4. The indexable universal cartridge of claim 3 wherein the axially resiliently yieldable region of said sleeve yields in response to an external torque between said housing and said sleeve to deflect the index tab and thereby permit rotation of said housing with respect to said sleeve to thereby bring more or less of the one or more diffusion ports of the housing into alignment with the one or more of the diffusion ports of the sleeve.

5. The indexable universal cartridge of claim 1 wherein said one or more diffusion ports of the sleeve comprises an axial row of one or more diffusion ports and the housing contains a plurality of transaxial rows of the one or more diffusion ports with said first sealing rib and said second sealing rib located substantially parallel to each other and having widths less than a lateral spacing between the one or more diffusion ports in each of the plurality of transaxial rows of the one or more diffusion ports to thereby inhibit lateral transfer of fluid between the housing and the sleeve.

6. The indexable universal cartridge of claim 1 wherein the one or more diffusion ports in said housing comprises a first and second set of one or more diffusion ports located diametrically opposite from each other.

7. The indexable universal cartridge of claim 1 including a float to maintain at least part of the universal cartridge in a submerged condition and part of the universal cartridge in an unsubmerged condition.

8. The indexable universal cartridge of claim 1 wherein the extension of the index tab of the housing engages with the notches of the circumferential slot of the sleeve to lock the housing to the sleeve and an upper sidewall and a lower sidewall of the circumferential slot acting to normally prevent an axial or rotational displacement of the housing with respect to the sleeve.

9. The indexable universal cartridge of claim 1 wherein the housing and the sleeve are comprised of a polymer plastic.

10. The universal indexable cartridge of claim 1 wherein the one or more diffusion ports in the sleeve extend in an axial direction and the one or more diffusion ports in the housing extend in both an axial direction and a circumferential direction.

11. The indexable universal cartridge of claim 1 wherein the housing has a frusto conical shape and the sleeve has a frusto conical shape so that a full frictional engagement between said first sealing rib and said second sealing rib extending therebetween does not occur until the sleeve and housing are in an axially fixed position with respect to each other.

12. The indexable universal cartridge of claim 1 wherein the sleeve contains a viewing window and the housing includes one or more reference settings with at least one of the referencing settings visible through the viewing window so as to provide a visible diffusion setting of the universal cartridge when the housing and sleeve are in an assembled condition.

* * * * *